(12) United States Patent
Wang et al.

(10) Patent No.: US 10,031,961 B1
(45) Date of Patent: Jul. 24, 2018

(54) SYSTEMS AND METHODS FOR DATA REPLICATION

(71) Applicant: CA, Inc., Islandia, NY (US)

(72) Inventors: Xiaopin Wang, Beijing (CN); Haiyang Zhang, Beijing (CN); Shishen Liu, Beijing (CN); Ran Shuai, Beijing (CN)

(73) Assignee: CA, Inc., New York, NY (US)

(*) Notice: Subject to any disclaimer, the term of this patent is extended or adjusted under 35 U.S.C. 154(b) by 598 days.

(21) Appl. No.: 13/923,170

(22) Filed: Jun. 20, 2013

(51) Int. Cl.
| | | |
|---|---|---|
| G06F 7/00 | (2006.01) | |
| G06F 17/00 | (2006.01) | |
| G06F 17/30 | (2006.01) | |
| G06F 11/14 | (2006.01) | |
| G06F 7/22 | (2006.01) | |

(52) U.S. Cl.
CPC .... *G06F 17/30581* (2013.01); *G06F 11/1448* (2013.01); *G06F 17/30575* (2013.01); *G06F 7/22* (2013.01)

(58) Field of Classification Search
None
See application file for complete search history.

(56) References Cited

U.S. PATENT DOCUMENTS

| | | | | |
|---|---|---|---|---|
| 6,549,992 B1* | 4/2003 | Armangau | ......... | G06F 11/1456 707/999.202 |
| 6,675,177 B1* | 1/2004 | Webb | ......... | G06F 11/1458 |
| 7,725,438 B1* | 5/2010 | Shah | ......... | G06F 11/1458 707/646 |
| 7,797,279 B1* | 9/2010 | Starling et al. | ......... | 707/641 |
| 8,201,021 B1* | 6/2012 | Shah | ......... | G06F 11/1453 714/15 |
| 8,606,751 B1* | 12/2013 | Starling et al. | ......... | 707/634 |
| 8,705,537 B1* | 4/2014 | Borac | ......... | 370/394 |
| 8,812,455 B1* | 8/2014 | Claudatos et al. | ......... | 707/664 |
| 2003/0084252 A1* | 5/2003 | Talagala | ......... | G06F 12/0866 711/135 |
| 2005/0055520 A1* | 3/2005 | Kappler | ......... | 711/162 |
| 2008/0005465 A1* | 1/2008 | Matthews | ......... | G06F 3/0619 711/113 |
| 2011/0113012 A1* | 5/2011 | Gruhl et al. | ......... | 707/646 |
| 2012/0084261 A1* | 4/2012 | Parab | ......... | 707/654 |
| 2012/0317379 A1* | 12/2012 | Ali et al. | ......... | 711/158 |
| 2013/0223336 A1* | 8/2013 | Lindner | ......... | H04L 47/35 370/328 |
| 2014/0258241 A1* | 9/2014 | Chen et al. | ......... | 707/683 |
| 2014/0281183 A1* | 9/2014 | Edgar | ......... | G06F 12/0692 711/104 |

* cited by examiner

*Primary Examiner* — David T Brooks
(74) *Attorney, Agent, or Firm* — Gilliam IP PLLC

(57) ABSTRACT

Systems, methods, and software program products discussed herein can create a backup or replica of a master. A method can include receiving, at a backup server, a serialized stream of data representative of changes to a first file of a computer and sorting the received stream of data and storing the sorted data in a memory. The method can include sending an acknowledgment to the computer indicating that the stream of data was received, writing all the sorted data to a single second file, and merging, on the backup server, the written data with data representative of a backup of data on the computer in response to writing all the sorted data to the single second file.

12 Claims, 3 Drawing Sheets

SYSTEMS AND METHODS FOR DATA REPLICATION

BACKGROUND

Periodic replication of changed (e.g., augmented or altered) data can be prohibitively time consuming or resource intensive. Periodic replication can lead to inconsistency (e.g., incoherency) between information on a replica server and a master server such as at a time when the periodic backup is updated or between updates.

BRIEF SUMMARY

According to one aspect of the present disclosure, a method of creating a backup or replica can include receiving, at a backup server, a serialized stream of data representative of changes to a first file of a computer, sorting the received stream of data and storing the sorted data in a memory, and sending an acknowledgment to the computer indicating that the stream of data was received. The method can include writing all the sorted data to a single second file, and merging, on the backup server, the written data with data representative of a backup of data on the computer in response to writing all the sorted data to the single second file.

According to another aspect of the present disclosure, a system configured to create a backup or replica can include a memory with instructions stored thereon and a processor configured to execute the instructions and cause the backup server to perform operations including receiving, at a backup server, a serialized stream of data representative of changes to a first file of a computer. The memory can include instructions, which when executed by the processor, cause the backup server to perform operations including sorting the received stream of data and storing the sorted data in a cache memory, sending an acknowledgment to the computer indicating that the stream of data was received, writing all the sorted data to a single second file, and merging, on the backup server, the written data with data representative of a backup of data on the computer in response to writing all the sorted data to the single second file.

According to yet another aspect of the present disclosure, a computer program product for creating a backup or replica includes a computer readable storage medium having computer readable program code embodied therewith, the computer program code including computer readable program code configured to receive, at a backup server, a serialized stream of data representative of changes to a first file of a computer and sort the received stream of data and store the sorted data in a cache memory. The computer readable program code can be configured to send an acknowledgment to the computer indicating that the stream of data was received, write all the sorted data to a single second file, and merge, on the backup server, the written data with data representative of a backup of data on the computer in response to writing all the sorted data to the single second file.

BRIEF DESCRIPTION OF THE DRAWINGS

Aspects of the present disclosure are illustrated by way of example and are not limited by the accompanying FIGS. with like references indicating like elements.

DETAILED DESCRIPTION

Figure 1:
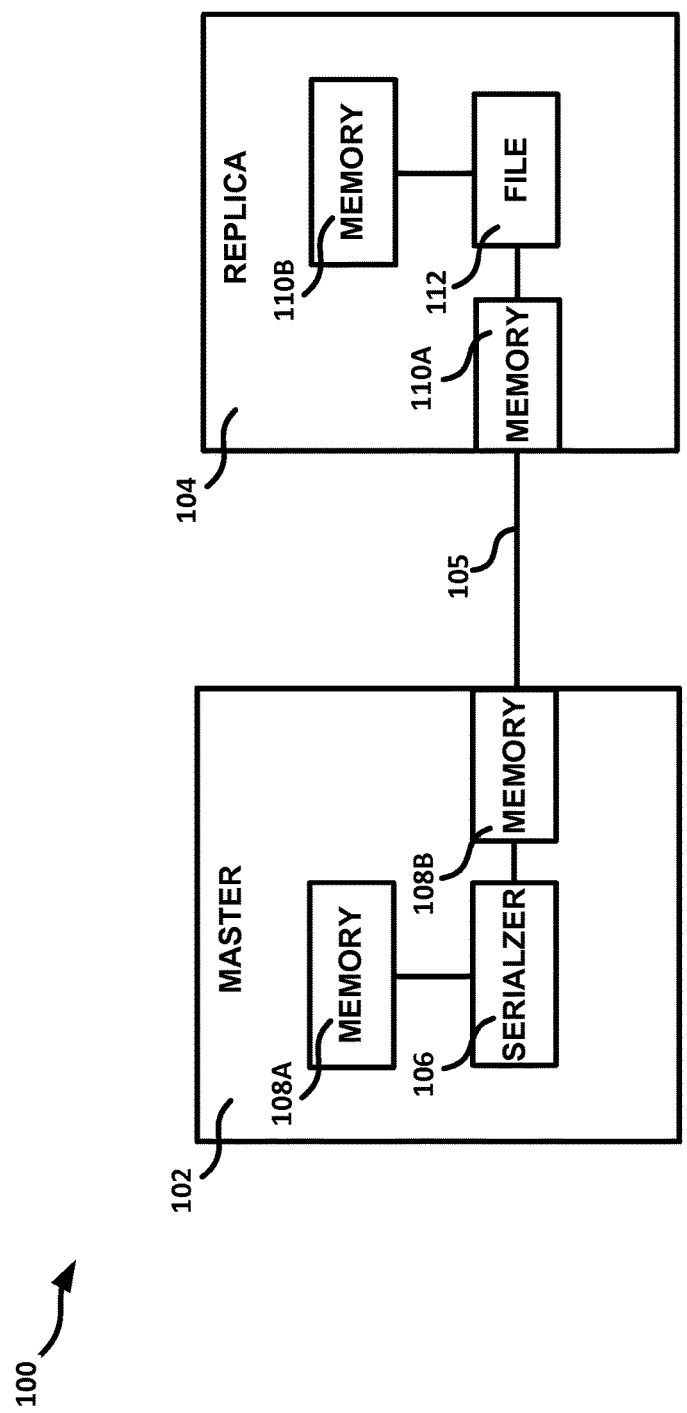
FIG. 1 illustrates a block diagram of an example of a replication system.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented in entirely hardware, entirely software (including firmware, resident software, micro-code, etc.) or in a combination of software and hardware that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of techniques, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Techniques and systems that backup or replicate data stored on a system can be time consuming or resource intensive. The efficiency of a backup or replication system (e.g., the amount of time it takes or the resources required to back up at least a portion of a memory) can be improved to reduce the amount of time or resources required to perform the backup or replication.

A periodic replication can be performed by monitoring and consolidating changes on a master device (e.g., a server, computer, memory, or the like) and sending them to and merging them with data on a replica device periodically or by demand. A user may want the data on the replica device to remain coherent (e.g., consistent), such as by either merging all or none of the changes on the master device with the data on the replica device (e.g., at least for one round of replication or backup). Some replication (e.g., backup) systems can apply data received at the replica device shortly after receiving the data. Such systems can apply changes to the replica device and the replica or master devices can be stopped or crashed before all the replication data is received or sent, respectively. Such systems can apply changes to the replica device after a file is received, but before receiving all the files including replication or backup data to be applied to the data on the replica.

The rate at which the master device sends replication data to the replica device can be improved, such as to allow the master device to return to monitoring for changes relatively quickly. Such improvements can alleviate at least some performance or efficiency issues realized with periodic replication.

The replica device can merge all or none of the replication data received in a given round of replication. If the replica device or the master device is stopped, prevented, or otherwise interrupted in receiving or sending the replication data, respectively, the process can drop the data received or sent, and the process can start over receiving data when the respective device comes back online. Such correction mechanisms can be helpful in slow Wide Area Network (WAN) systems where data re-synchronization may not be preferred.

A periodic system or method discussed herein can be integrated with existing back up or replication systems, such as to improve performance or efficiency on an existing system (e.g., a disk to disk back up or replication system). A disk to disk system can create incremental data sessions and merge the incremental data sessions as a function of one or more defined policies. Because the incremental merges can move data from sessions prior to discarding outdated incremental sessions or temporary incremental sessions, it can be a waste of bandwidth for the disk to disk system to replicate through continuous data processing to the replica. Instead, a periodic replication mode can be used. A Replication and High Availability (RHA) system can monitor and consolidate the changes on the disk to disk system and send the final results of the monitoring to the replica at a specified time interval or on demand. The final results can be sent to the replica soon (e.g., immediately) after the disk to disk system completes the monitoring or merging of changes on the disk to disk system.

FIG. 1 is a block diagram of an example of a system 100 configured for data replication. The system 100 can include a master 102 (e.g., a server, memory, or other data storage device, such as a disk to disk compatible computer) and a replica 104 (e.g., a server, memory, or other data storage device, such as a disk to disk compatible computer). The master 102 can be communicatively coupled to the replica 104 through a connection 105. The connection can be a hardwired or wireless direct or network connection. Various forms of networks, such as virtual private networks, the internet, WAN, the internet, local area networks, or other means of connecting devices together to facilitate data transfer can be used for connection 105.

The master 102 can monitor changes to data stored on memory 108A. The memory 108A can be a main or cache memory or other type of memory capable of storing bits that can be read or processed by a processor.

The master 102 can record incremental changes to the memory 108A, such as by recording only modified data ranges. The changes to the memory 108A can include changes to the data in a file and can also include changes to metadata associated with the file saved in the memory 108A. The metadata changes can include changes to a root directory of the master 102. Incremental changes can be recorded by recording only ranges of data that have changed, rather than recording the entire file after the data in the file has changed. For example, the master 102 can create an incremental snapshot that includes data representative of only the changes to the data in the file, metadata associated with a file or a root directory, or ranges of data in the memory 108A.

Instead of sending the incremental changes through multiple journal files (e.g., files of approximately the same size) that each include a portion of all the incremental changes to be made in a memory 110A in the replica 104, the master 102 can aggregate all the incremental changes and send them in a single stream (e.g., as a single file) to the replica 104. Changes to the metadata associated with a file or root directory of the master 102 can be sent before the changes to data in the file. Changes to the metadata can include a file rename, a created file indicator, or a removed file indicator, among others.

A portion of a synchronization process can be used to help speed up the sending of data from the master 102 to the replica 104. The serializer 106 can organize the data to be sent to the replica 104 (e.g., sent to the replica 104 in a stream). The serializer 106 can concatenate changes to the data of the master 102, such as at a level that corresponds to functions that manage backing up or replication of the master 102. The data of the master 102 can include data from one or more files or metadata. The serialized stream may be communicated between the master 102 and the replica 104 using various communication protocols that can stream the serialized data. The serialized data can be streamed in chunks or packets that can be reassembled for use in replication functions.

A memory 108B (e.g., a cache memory) can be used to store a portion of the data to be sent (e.g., sequentially). The memory 108B can send multiple portions of the data to be sent without waiting for an acknowledgment from the replica 104 between portions. The acknowledgment can be an indicator to indicate the data was received successfully. The replica 104 can send an acknowledgment at or after the time all of the data to be sent is received.

The replica 104 can sort the received data such that it is in a specified (e.g., logical) order, such as in memory 110B (e.g., a cache memory). The data can be received in chunks (e.g., cache memory sized chunks). Each chunk of data can include a corresponding number. The chunk number can indicate an order in which the chunks can be sorted. The sorted chunks can eventually form a set of data to be written to a journal file. The replica 104 can write the data received at the memory 110B to a single file 112. In writing to the file 112, buffers can be disabled (e.g., no buffer is used) and the write can be done in write-back mode, such as by disabling a write through flag (e.g., without using a write through process). Disabling buffers and using a write back process can improve write time. When buffers are disabled and write back, not write through, are used, the transfer rate of data can be equal to or greater than the transfer speed during synchronization. In many current backup or replication systems, the transfer speed during synchronization is greater than the transfer speed during backup or replication.

A study was completed that demonstrated that sending a single file with ten gigabytes of data can be transferred faster than sending 10,000 files each with one megabyte of data (ten gigabytes of data total).

The data sent from the master 102 can include an indicator that identifies the end of the data to be sent. The replica 104 can send the acknowledgment at or after the time it receives the indicator. The replica 104 can merge the data sent and received with other data after the indicator is received (e.g., after all the data to be sent).

In one or more embodiments, the process of merging the incremental data changes with a previous back up cannot be stopped by a user through a Graphical User Interface (GUI). In such embodiments, a user can click a button configured to stop the replication or backup process, such as in an RHA system. In response to the user clicking the button an instruction can be sent to the master 102 or replica 104 indicating that a request to stop the backup or replication process has been received. The master 102 or replica 104 can be configured to suspend the request or notify the user that the process will not be stopped (e.g., the process will be allowed to finish).

In one or more embodiments, a user can stop the process through the GUI. The replica 104 can discard the partially received data or the partially populated file that may have been created after the data was received in response to receiving an instruction to stop the process. In either version, the data on the replica 104 can remain coherent or consistent, as long as the replica 104 does not crash or is not manually turned off.

The replica 104 can be configured to avoid re-synchronization in response to the replica 104 crashing or rebooting. The replica 104 can use additional data (e.g., data different from the data received from the master 102 in a replication or backup process) to recover from the interruption of the backup or replication. The replica 104 can maintain the data from the most recently completed replication or backup or another completed replication or backup. This maintained data can include directory structures and properties of root directories (e.g., protected root directories) of the master 102.

The replica 104 can apply the changes to the metadata to update a snapshot of the master 102 saved thereon. After the metadata of the snapshot is updated the replica's root directories can be updated to reflect the changes indicated by the received data. The progress of applying these updates or changes to the snapshot and the root directories of the replica 104 can be recorded to a memory 110B. If the changes indicated by the data have been applied, they can be discarded. In such a configuration, the changes may be applied only once. If the replica 104 crashes or a connection between the master 102 and replica is otherwise interrupted or broken, the master 102 can postpone sending the backup or replication data until the connection between the master 102 and the replica 104 is reestablished.

Patches to the incomplete backup or replication data received at the replica 104 can be stored in the replica 104. Patches to the incomplete backup or replication data can include data that was not applied to the replica 104 because of an interruption to the replication or backup process. At or around the time the replica 104 comes back online the patches can be applied until the process has finished (e.g., until the data on the master 102 and the replica 104 are coherent or consistent). The patches can be consolidated or merged, such as to save space. For example, consider a set of patches that includes two writes to the same location, the write that is earlier in time can be discarded when the write that is later in time reflects, includes, or modifies the changes of the write that is earlier in time.

The storage space for recording changes in the master 102 can be relatively small compared to the amount of storage space available on the master 102, so the master 102 can have the ability to wait for a relatively long period of time for the connection to the replica 104 to be reestablished before a memory 108A or 108B is full.

In response to the connection to the replica 104 being reestablished, the replica 104 can start from the last recorded state on the replica 104. If the replica 104 crashed during updating a directory snapshot, the replica 104 can discard the incomplete directory snapshot and update the most current snapshot. If the replica 104 crashed after updating the directory snapshot but during applying metadata changes, such as to root directories of the replica 104, the replica 104 can use the last two rounds of directory snapshots together with the metadata changes to deduce when the crash occurred. This deduction can be accomplished by applying metadata changes starting from the changes in the previous directory snapshot and continuing to the current metadata changes, such as one by one, while comparing the directory snapshot to the current root directories. When the root directories are consistent with the directory snapshot, the next metadata changes can be applied to the one or more root directories.

If the replica 104 crashed after updating the file data of root directories, the replica 104 can resume by applying non metadata changes from the beginning of the changes. Applying a change twice is redundant, as it results in the same data being stored on the replica 104. Thus, it is not necessary to figure out where the replica 104 left off in applying changes to the file data of the one or more root directories.

Figure 2:
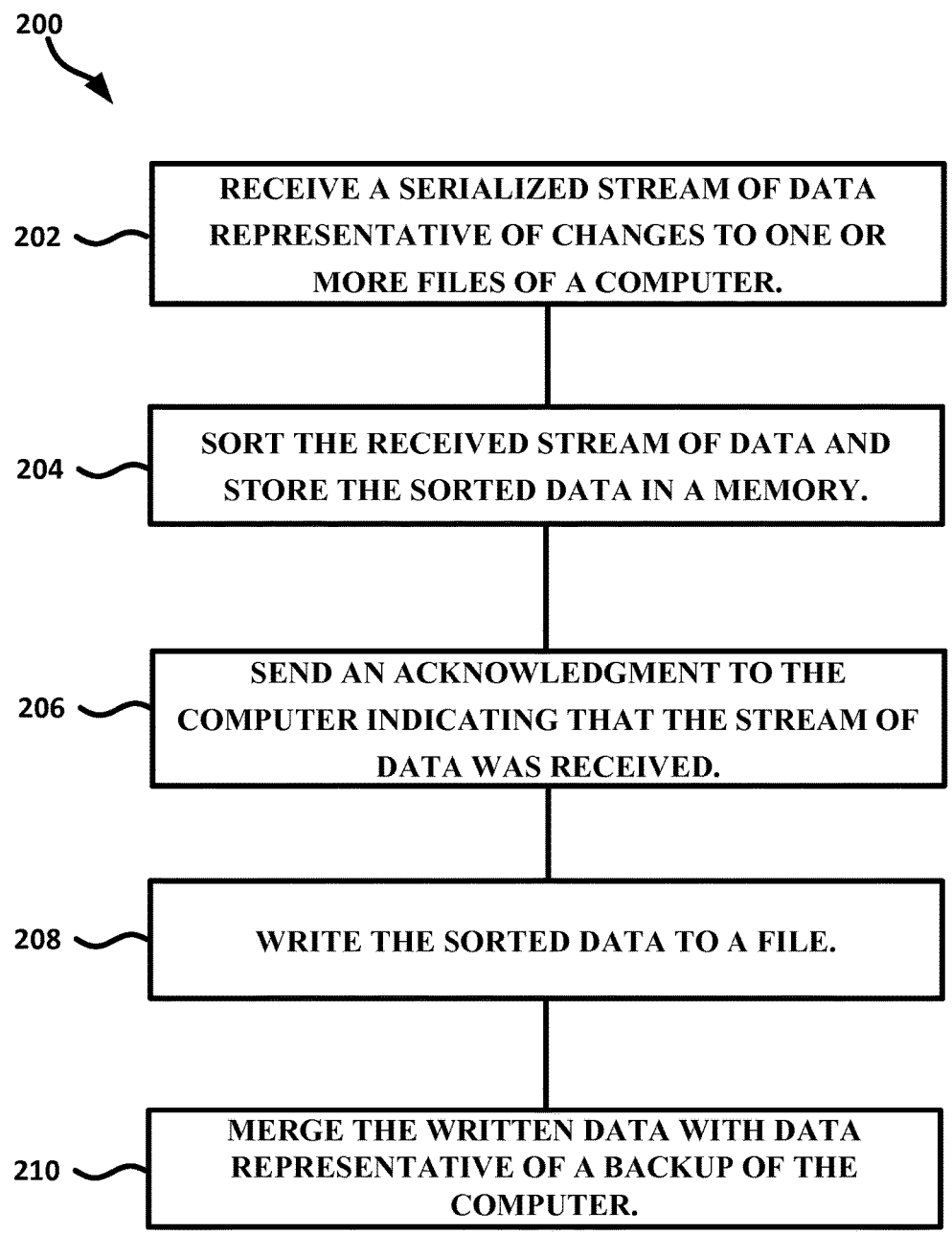
FIG. 2 illustrates a flow diagram of an example of a technique for data replication.

FIG. 2 is a flow diagram of an example of a technique 200 for enhanced data replication. At 202, a serialized stream of data representative of changes to one or more files of a computer (e.g., the master 102) can be received, such as at a backup server (e.g., the replica 104). Changes to metadata associated with a root directory of the computer can be received before receiving the data representative of changes to the one or more files, wherein the changes to metadata comprise at least one of a rename, create, or remove change to the metadata. In one or more embodiments, receiving the serialized stream of data cannot be interrupted through a graphical user interface on the backup server or the computer being backed up or replicated. Receiving the serialized stream of data can include receiving the serialized stream of data at a rate that is at least as fast as a synchronization speed of the backup server.

At 204, the received stream of data can be sorted and stored in a memory (e.g., the memory 110A or 110B, such as a cache memory). At 206, an acknowledgment can be sent to the computer indicating that the stream of data was received. At 208, the sorted data can be written to a file (e.g., a single file). Writing the sorted data to the file can include writing the sorted data to the file without a buffer and without a write through flag set. Writing the sorted data to the file can include writing metadata to the file. An end of stream indicator can be received indicating an end to the data stream. The end of stream indicator can be at the end of the data stream or at a predefined point in the data stream, such that the backup server can determine how much more data is to be received in the stream. Writing the sorted data to the file can include writing the sorted data to the file after (e.g., in response to) receiving the end of stream indicator or after all the data from the stream is received.

At 210, the written data can be merged with data (e.g., saved on a memory 110A or 110B on the replica 104) representative of a backup of data on the computer. The metadata can be merged with a root directory (e.g., a directory that is not a sub-part of another directory) on the backup server before the data representative of the changes to the file are merged with a backup of the file. The technique can include creating a snapshot of the backup and the received stream of data so as to avoid re-synchronization of the backup server in response to the backup server coming back online.

Figure 3:
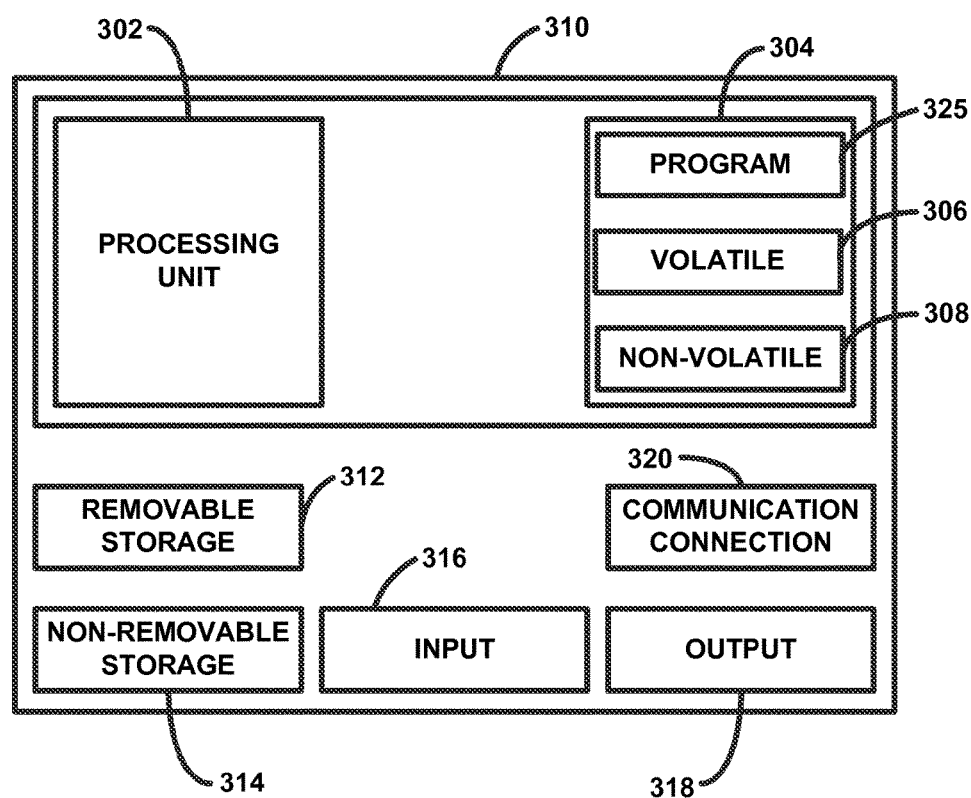
FIG. 3 illustrates an example of a computer system.

FIG. 3 is a block diagram of a computing device, according to an example embodiment. In one or more embodiments, multiple such computer systems are utilized in a distributed network to implement multiple components in a transaction-based environment. An object-oriented, service-oriented, or other architecture can be used to implement such functions and communicate between the multiple systems and components. An example computing device in the form of a computer 310 can include a processing unit 302, memory 304, removable storage 312, and non-removable storage 314. Memory 304 can include volatile memory 306 and non-volatile memory 308. Computer 310 can include— or have access to a computing environment that includes—a variety of computer-readable media, such as volatile memory 306 and non-volatile memory 308, removable storage 312 and non-removable storage 314. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 310 can include or have access to a computing environment that includes input 316, output 318, and a communication connection 320 to communicate with mobile devices via a port coupled to a network connection such as the internet or cellular network. The computer can operate in a networked environment using a communication connection to connect to one or more remote computers, such as database servers. The remote computer can include a personal computer (PC), server, router, network PC, a peer device or other common network node, or the like. The communication connection can include a Local Area Network (LAN), a Wide Area Network (WAN) or other networks.

Computer-readable instructions stored on a computer-readable medium are executable by the processing unit 302 of the computer 310. A hard drive, CD-ROM, and RAM are some examples of articles including a non-transitory computer-readable medium. For example, a computer program 325 capable of performing one or more of the methods illustrated and described herein can be stored on a non-transitory computer-readable medium. An example of such a computer program can include a computer readable storage medium having computer readable program code embodied therewith, the computer program code can include computer readable program code configured to receive, at a backup server, a serialized stream of data representative of changes to a first file of a computer, sort the received stream of data and store the sorted data in a cache memory, send an acknowledgment to the computer indicating that the stream of data was received, write all the sorted data to a single second file; and merge, on the backup server, the written data with data representative of a backup of data on the computer in response to writing all the sorted data to the single second file.

The flowchart(s) and block diagram(s) in the FIGS. illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the FIGS. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method comprising:
 receiving, at a backup server, a serialized stream of data representative of multiple changes to data in a volatile memory of a computer, wherein the serialized stream of data comprises an end indicator indicating completion of transmission of the serialized stream of data from the computer;
 sorting the serialized stream of data; and
 in response to receipt of the end indicator:
  sending an acknowledgment to the computer indicating that the serialized stream of data was received;
  writing the sorted data to a file, wherein writing the sorted data comprises,
   writing the sorted data to the file in a cache memory at the backup server; and
   writing the sorted data to the file in a non-cache memory at the backup server at a subsequent delayed interval relative to writing the sorted data to the file in the cache memory;
  creating, on the backup server, a snapshot of the sorted data and the data representative of a backup of data on the computer; and
  merging, on the backup server, the sorted data written to the file with data representative of a backup of data on the computer in response to writing the sorted data to the file, wherein the merging is after creating the snapshot of the sorted data and the data representative of the backup of data on the computer.

2. The method of claim 1, further comprising:
 receiving changes to metadata associated with a root directory of the computer before receiving the data representative of the multiple changes to the data, wherein the changes to metadata comprise at least one of a rename, create, or remove change to the metadata; and
 wherein the changes to metadata associated with the root directory of the computer are written to the file.

3. The method of claim 2, wherein the merging cannot be interrupted by input from a graphical user interface.

4. The method of claim 3, wherein writing the sorted data to the file comprises writing the sorted data to the file in a write-back mode without performing a write through process.

5. A system comprising:
 a backup server comprising a memory with instructions stored thereon and a processor configured to execute the instructions and cause the backup server to perform operations comprising:
  sorting a serialized stream of data representative of multiple changes to data in a volatile memory of a computer, wherein the serialized stream of data comprises an end indicator indicating completion of transmission of the serialized stream of data from the computer; and
  in response to receipt of the end indicator:
   sending an acknowledgment to the computer indicating that the serialized stream of data was received;
   writing the sorted data to a file, wherein the memory with instructions executable by the processor to cause the backup server to write the sorted data comprises instructions executable by the processor to cause the backup server to perform operations comprising,
    writing the sorted data to the file in a cache memory at the backup server; and
    writing the sorted data to the file in a non-cache memory at the backup server at a subsequent delayed interval relative to writing the sorted data to the file in the cache memory;
   creating, on the backup server, a snapshot of the sorted data and the data representative of a backup of data on the computer; and
   merging, on the backup server, the sorted data written to the file with data representative of a backup of data on the computer in response to writing the sorted data to the file, wherein the merging is after creating the snapshot of the sorted data and the data representative of the backup of data on the computer.

6. The system of claim 5, wherein the memory further comprises instructions stored thereon that, when executed by the processor, cause the backup server to perform operations comprising:

receiving changes to metadata associated with a root directory of the computer before receiving the data representative of the multiple changes to the data, wherein the changes to metadata comprise at least one of a rename, create, or remove change to the metadata; and wherein the changes to metadata associated with the root directory of the computer are written to the file.

7. The system of claim 6, wherein the processor configured to execute the instructions and cause the backup server to perform operations comprising merging cannot be interrupted by input from a graphical user interface.

8. The system of claim 7, wherein the processor configured to execute the instructions and cause the backup server to perform operations comprising writing the sorted data comprises the processor configured to execute the instructions and cause the backup server to perform operations comprising writing the sorted data to the file in a write-back mode without performing a write through process.

9. One or more non-transitory machine-readable storage media having program code stored therein, the program code comprising instructions to:

sort a serialized stream of data representative of multiple changes to data in a volatile memory of a computer, wherein the serialized stream of data comprises an end indicator indicating completion of transmission of the serialized stream of data from the computer; and in response to receipt of the end indicator:
send an acknowledgment to the computer indicating that the serialized stream of data was received;
write the sorted data to a file, wherein the instructions to write the sorted data comprises instructions to,
write the sorted data to the file in a cache memory; and
write the sorted data to the file in a non-cache memory at a subsequent delayed interval relative to the write of the sorted data to the file in the cache memory;

create a snapshot of the sorted data and the data representative of a backup of data on the computer; and merge the sorted data written to the file with data representative of a backup of data on the computer in response to writing the sorted data to the file, wherein the instructions to merge comprise the instructions to merge after creation of the snapshot of the sorted data and the data representative of the backup of data on the computer.

10. The one or more non-transitory machine-readable storage media of claim 9, wherein the program code comprises instructions to:

receive changes to metadata associated with a root directory of the computer before receiving the data representative of the multiple changes to the data, wherein the changes to metadata comprise at least one of a rename, create, or remove change to the metadata; and wherein the changes to metadata associated with the root directory of the computer are written to the file.

11. The one or more non-transitory machine-readable storage media of claim 10, wherein the instructions to merge cannot be interrupted by input from a graphical user interface.

12. The one or more non-transitory machine-readable storage media of claim 11, wherein the instructions to write the sorted data to the file comprises instructions to write the sorted data to the file in a write-back mode without performing a write through process.

* * * * *